US010166867B2

United States Patent
Florentin et al.

(10) Patent No.: US 10,166,867 B2
(45) Date of Patent: Jan. 1, 2019

(54) METHOD TO CONTROL REACTION FORCE OF AN ACCELERATOR PEDAL SYSTEM

(71) Applicant: VOLVO TRUCK CORPORATION, Göteborg (SE)

(72) Inventors: Gregory Florentin, Saint Just Chaleyss (FR); Florian Pereyron, Lyons (FR); Arnaud Chansavang, Villeurbanne (FR); Christophe Gauthier, Chasse sur Rhône (FR)

(73) Assignee: Volvo Truck Corporation, Göteborg (SE)

( * ) Notice: Subject to any disclaimer, the term of this patent is extended or adjusted under 35 U.S.C. 154(b) by 44 days.

(21) Appl. No.: 15/509,152

(22) PCT Filed: Sep. 24, 2014

(86) PCT No.: PCT/EP2014/002579
§ 371 (c)(1),
(2) Date: Mar. 6, 2017

(87) PCT Pub. No.: WO2016/045687
PCT Pub. Date: Mar. 31, 2016

(65) Prior Publication Data
US 2017/0282922 A1    Oct. 5, 2017

(51) Int. Cl.
*B60K 31/08* (2006.01)
*B60K 31/02* (2006.01)
(Continued)

(52) U.S. Cl.
CPC .............. *B60K 31/08* (2013.01); *B60K 31/02* (2013.01); *B60K 31/06* (2013.01); *B60W 30/188* (2013.01);
(Continued)

(58) Field of Classification Search
CPC ........ B60K 31/08; B60K 31/02; B60K 31/06; B60K 2031/0091; B60W 30/188;
(Continued)

(56) References Cited

U.S. PATENT DOCUMENTS 3,721,309 A * 3/1973 Donaldson ............. B60K 31/02
180/171
4,424,876 A * 1/1984 Filho ...................... B60K 31/08
180/175
(Continued)

FOREIGN PATENT DOCUMENTS

CN    102112336 A    6/2011
EP    2 248 700 A1   11/2010
(Continued)

OTHER PUBLICATIONS

Chinese Official Action (dated Jul. 4, 2018) for corresponding Chinese App. 201480081997.6.
(Continued)

*Primary Examiner* — Dale W Hilgendorf
(74) *Attorney, Agent, or Firm* — WRB-IP LLP

(57) ABSTRACT

A method is provided to control the acceleration of a motor vehicle from a current speed, wherein the motor vehicle includes an accelerator pedal system able to generate on the accelerator pedal an added reaction force when the depression of the accelerator pedal reaches a given depression level. The method includes the steps of: a) measuring the current vehicle speed; b) determining a target speed of the motor vehicle in function at least of the current vehicle speed or determining from the current vehicle speed a maximum acceleration rate; c) determining at least one threshold depression level of the accelerator pedal that corresponds to the stabilization of the vehicle speed at the target speed or that corresponds to maximum acceleration rate; d) generating an added reaction force on the accelerator pedal if the
(Continued)

depression of the accelerator pedal reaches or is about to reach the threshold depression level; wherein at least steps a), b), and c) are automatically repeated as vehicle speed increases.

13 Claims, 3 Drawing Sheets

(51) Int. Cl.
  *B60K 31/06* (2006.01)
  *B60W 30/18* (2012.01)
  *B60W 30/188* (2012.01)
  *B60K 26/02* (2006.01)
  *B60K 31/00* (2006.01)
  *B60K 31/04* (2006.01)

(52) U.S. Cl.
  CPC ....... *B60W 30/1819* (2013.01); *B60K 26/021* (2013.01); *B60K 31/00* (2013.01); *B60K 31/04* (2013.01); *B60K 2026/023* (2013.01); *B60K 2031/0091* (2013.01); *B60K 2310/242* (2013.01); *B60K 2310/244* (2013.01); *B60W 2540/10* (2013.01); *B60W 2540/103* (2013.01); *B60W 2720/106* (2013.01)

(58) Field of Classification Search
  CPC ....... B60W 30/1819; B60W 2540/103; B60W 2540/10; B60W 2720/106
  See application file for complete search history.

(56) References Cited

U.S. PATENT DOCUMENTS

| | | | |
|---|---|---|---|
| 8,457,855 B2* | 6/2013 | Sakaguchi et al. | B60K 26/021 701/70 |
| 9,176,515 B2* | 11/2015 | Maruyama et al. | B60K 26/021 |
| 2004/0182620 A1* | 9/2004 | Dornhausen | B60W 2540/10 180/170 |
| 2004/0195022 A1* | 10/2004 | Inoue | B60K 26/021 180/170 |
| 2010/0250084 A1 | 9/2010 | Takiguchi et al. | |
| 2011/0125367 A1* | 5/2011 | Sakaguchi et al. | B60K 26/021 701/36 |

FOREIGN PATENT DOCUMENTS

| | | |
|---|---|---|
| FR | 2 897 450 A1 | 8/2007 |
| JP | 2005132225 A | 5/2005 |
| WO | 2010/013133 A1 | 2/2010 |

OTHER PUBLICATIONS

International Search Report (dated Jun. 10, 2015) for corresponding International App. PCT/EP2014/002579.

* cited by examiner

METHOD TO CONTROL REACTION FORCE OF AN ACCELERATOR PEDAL SYSTEM

BACKGROUND AND SUMMARY

The present invention relates to method for controlling a reaction force applied on an accelerator pedal of a motor vehicle in order to improve eco-driving.

Typically, an accelerator pedal system is provided in a motor vehicle, and an accelerator pedal is depressed by driver's foot in order to increase a vehicle speed.

According to a conventional accelerator pedal system, the accelerator pedal is connected to a throttle valve via an electric circuit and via at least one electric actuator to modify the degree of opening of the throttle valve depending on a position change of the accelerator pedal.

Motor vehicles are commonly provided with speed limiter wherein a target speed of the vehicle speed can be adjusted by the driver. In this case an added reaction force is applied on the accelerator pedal, typically by an electric motor, at a threshold depression angle of the accelerator pedal that is determined depending on the target vehicle speed. The added reaction force is generally activated on the accelerator pedal when the speed of the vehicle approaches the target vehicle speed in order to limit or reduce the acceleration rate of the vehicle engine each time the depression angle of the accelerator pedal reaches the threshold depression angle so that the vehicle can't exceed the target speed.

Such a common speed limiter doesn't encourage a driver to perform eco-driving in order to reduce fuel consumption of the vehicle because as long as the current speed of the vehicle is far below the target speed, the driver has the possibility to control acceleration of the vehicle and its engine, at a high rate without triggering the added reaction force.

It therefore appears that there is room for improvement to control a reaction force applied on an accelerator pedal of a motor vehicle in order to improve eco-driving and so to reduce fuel consumption of a motor vehicle.

It is desirable to provide an improved motor vehicle which can overcome the drawbacks encountered in traditional motor vehicles, from the eco-driving perspective.

The invention relates, according to an aspect thereof, to a method for controlling the acceleration of a motor vehicle from a cumin vehicle speed. Wherein said motor vehicle comprises an accelerator pedal system able to generate on the accelerator pedal an added reaction force when the depression of the accelerator pedal reaches or is about to reach a given depression level.

Said method comprises the steps of:
a) measuring the current vehicle speed;
b) determining a target speed of the motor vehicle depending at least on the current vehicle speed or determining from the current vehicle speed a maximum acceleration rate;
c) determining at least one threshold depression level of the accelerator pedal that corresponds to the stabilization of the vehicle speed at the target speed or that corresponds to the maximum acceleration rate;
d) generating an added reaction force on the accelerator pedal if the depression of the accelerator pedal reaches or is about to reach the threshold depression level;
wherein at least steps a), b) and c) are automatically repeated as the vehicle speed increases.

The method allows a limitation of the acceleration rate of the vehicle during acceleration phases. Number of acceleration peaks during acceleration phases and intensity level of these acceleration peaks can also be reduced.

Thanks to this control the fuel consumption of the vehicle can be greatly limited during accelerations phases of the vehicle.

BRIEF DESCRIPTION OF THE DRAWINGS

The following detailed description of several embodiments of the invention is better understood when read in conjunction with the appended drawings. It is however understood that the invention is not limited to the specific embodiments disclosed.

DETAILED DESCRIPTION

Figure 1:
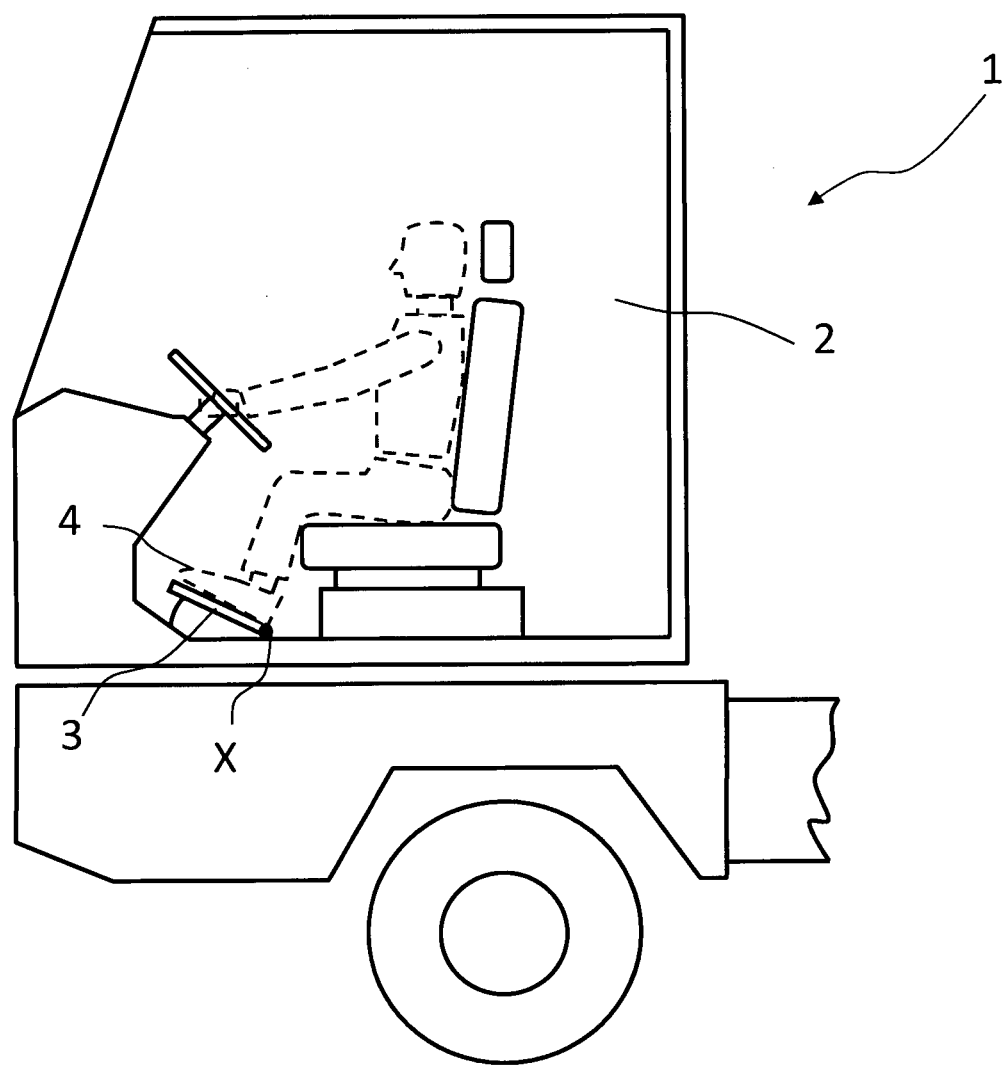
FIG. 1 shows the interior of a passenger compartment of a motor vehicle.

The invention relates to a method for controlling the acceleration of a motor vehicle from a current speed up to a higher speed. Such a motor vehicle 1 is partially represented on FIG. 1 and it can be a truck, a bus, a construction vehicle or a passenger car. FIG. 1 represents a passenger compartment 2 such as the cabin of a truck. A motor vehicle 1 generally comprises in the passenger compartment 2 an accelerator pedal 3 that can be depressed by the driver's foot 4 to modify acceleration and speed of the motor vehicle 1.

Figure 2:
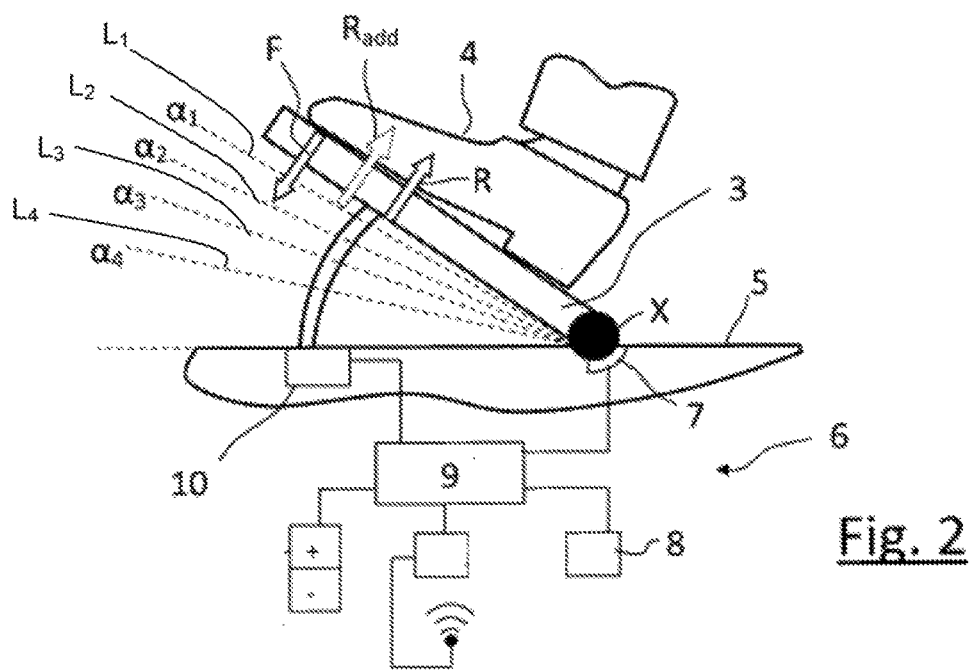
FIG. 2 is a schematic representation of an accelerator pedal with different threshold depression angles of the accelerator pedal.
Figure 3:
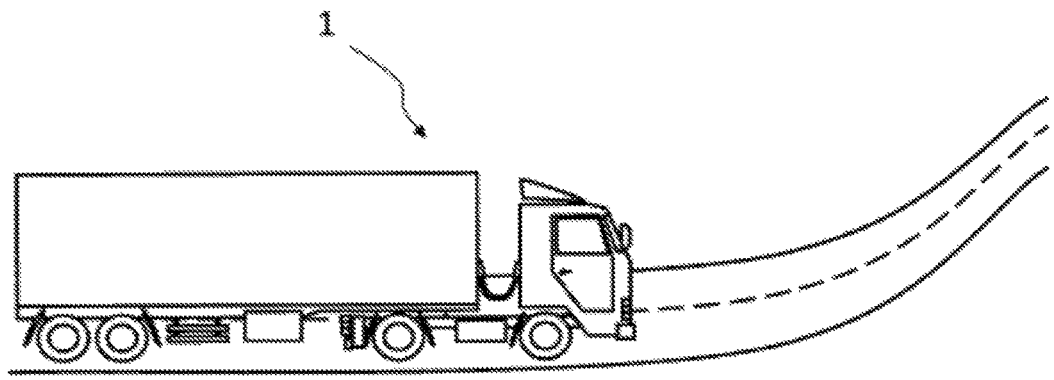
FIG. 3 represents the motor vehicle of FIG. 1 in a driving situation.

Conventionally and such as illustrated on FIG. 2, a reaction force R is generated by the accelerator pedal 3 to oppose a force F exerted by the driver's foot on the accelerator pedal 3 which tends to depress the accelerator pedal 3 towards the floor 5 of passenger compartment 2 in order to accelerate the motor vehicle 1.

The accelerator pedal system 6 used in the present invention is of the type permitting the application on the accelerator pedal 3 of an added reaction force $R_{add}$ that is added to the reaction force R when the depression of the accelerator pedal 3 reaches or is about to reach a given depression level $L_1$ (or $L_2$, $L_3$, or $L_4$).

Such an added reaction force $R_{add}$ is generated to encourage the driver to not depress the accelerator pedal 3 beyond the given depression level $L_1$ (or $L_2$, $L_3$, or $L_4$).

Such an accelerator pedal system 6 (see FIG. 2) may comprise a depression level sensor 7 to detect depression level of the accelerator pedal 3, a vehicle speed sensor 8 to measure a current vehicle speed $V_{spd}$, an ECU 9 (Electronic Control Unit) and a reaction force mechanism 10. The ECU 9 may, for instance, in function of a determined target speed calculate a threshold depression angle at which or beyond which can be applied an added reaction force $R_{add}$. The reaction force mechanism 10 may typically include an electric motor in order to generate on the acceleration pedal 3 the added reaction force $R_{add}$ when the threshold depression level is reached or exceeded by the accelerator pedal 3 during an acceleration phase.

As schematically represented in the example of FIG. 2, the accelerator pedal 3 is, for instance designed, to rotate around a rotation axis X. Therefore, in the example of FIG. 2, a threshold depression level $L_1$ (or $L_2$, $L_3$, or $L_4$) of the accelerator pedal 3 is represented as a threshold depression angle α ($α_1$, $α_2$, $α_3$).

Figure 4:
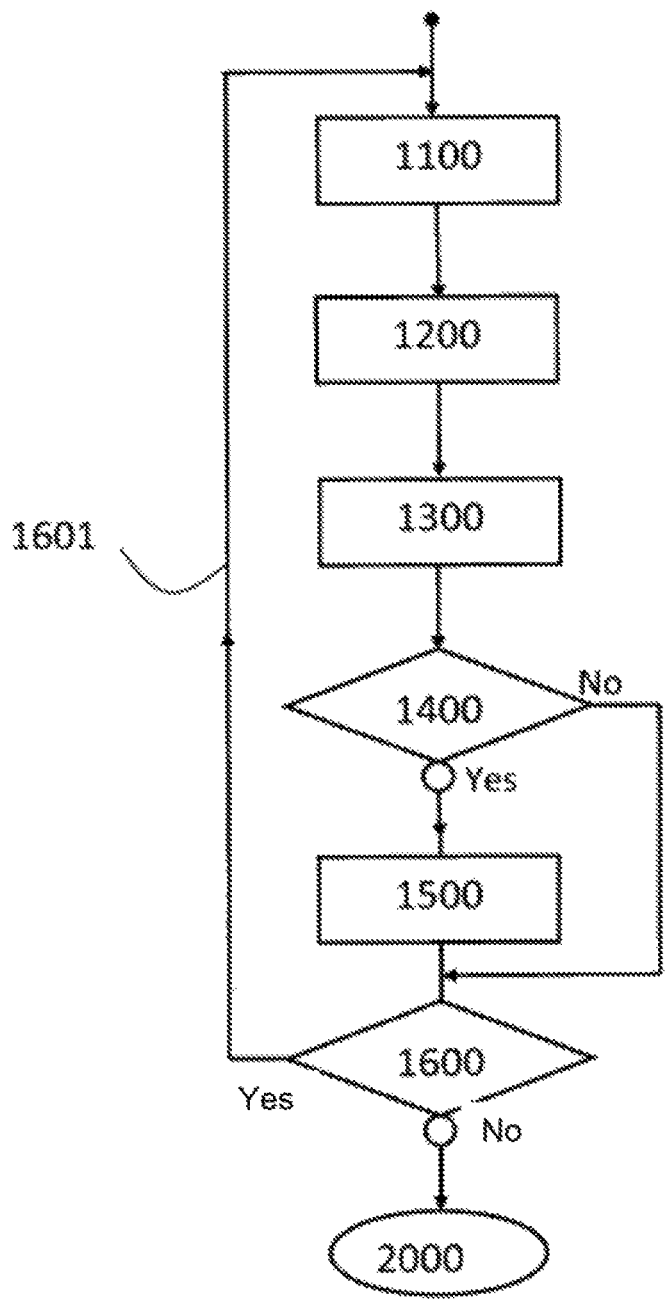
FIG. 4 is a flowchart representing the steps of a method for controlling the acceleration of a motor vehicle according to the invention.

An implementation of a method according to the invention is illustrated on FIG. 4 by a flowchart which represents the main steps of this implementation.

In a first step 1100, it is measured the current vehicle speed $V_{spd}$. The current vehicle speed $V_{spd}$ can be zero if the motor vehicle 1 is not moving.

In a second step 1200, it is determined a target speed $V_{targ}$ of the motor vehicle 1 depending at least on the current vehicle speed $V_{spd}$. Advantageously, the second step 1200 is initiated only if it is detected an
acceleration of the motor vehicle 1 or if it is detected an intention of the driver to accelerate the motor vehicle 1, for instance, thanks to the detection of a motion of the accelerator pedal 3 along a dead stroke of the accelerator pedal 3.

In third step 1300, it is determined at least one threshold depression level $L_i$, $\alpha_i$, of the accelerator pedal 3 that corresponds to the stabilization of the vehicle speed at the target speed $V_{targ}$.

In a fourth step 1400, it is checked if the depression of the accelerator pedal 3 reaches the threshold depression level $L_i$, $\alpha$. If the threshold depression level $L_i$, $\alpha$, is reached by the accelerator pedal 3, in a further step 1500, an added reaction force $R_{add}$ is generated on the accelerator pedal 3 in order to encourage the driver to limit the depression of the accelerator pedal 3.

In a variant of implementation of the fourth step 1400, it is checked if the depression of the accelerator pedal 3 is about to reach the threshold depression level $L_i$, $\alpha$. If the accelerator pedal 3 is about to reach the threshold depression level $L_i$, $\alpha$, in a further step 1500, an added reaction force $R_{add}$ is generated on the accelerator pedal 3 in order to limit depression of the accelerator pedal 3. The accelerator pedal 3 can be considered as being about to reach the threshold depression level $L_i$, $\alpha$, when the distance separating the actual position of the accelerator pedal 3 from the threshold depression level $L_i$, $\alpha$, is less than 5% of the total stroke of the accelerator pedal 3.

Thanks to a conditional step 1600 and a feedback loop 1601, at least steps 1100, 1200 and 1300 are automatically repeated as the vehicle speed $V_{spd}$ increases. Indeed, at step 1600, it is checked if the vehicle speed increases. If the result of the condition step 1600 is "yes", at least steps 1100, 1200 and 1300 are repeated via feedback loop 1601.

The repetition of steps 1200 and 1300 may consist in or comprise determining a new target speed $V_{targ+1}$ and a new threshold depression level $L_{i+1}$, $\alpha_{i+1}$ that corresponds to the stabilization of the vehicle speed at the new target speed $V_{targ+1}$.

When after repetition of steps 1100, 1200 and 1300 an added reaction force $R_{add}$ has to be generated on the accelerator pedal 3, step 1500 is also repeated.

If the motor vehicle 1 is stabilized at a given speed or is decelerating the result of the condition step 1600 is "no" and the method is ended by step 2000 until the motor vehicle 1 accelerates again.

Steps 1100, 1200 and 1300 can be repeated each time the vehicle speed $V_{spd}$ increases of a speed value comprised between 0.1 and 5 km/h, for instance, 1 km/h. In a variant steps 1100, 1200 and 1300 can be continuously repeated as the vehicle speed increases.

Target speed $V_i$ and new target speed $V_{i+}$ are preferably determined depending on the actual load of the motor vehicle 1 and/or the gear ratio of the gearbox currently used and/or the current vehicle acceleration and/or the current slope and/or the current curve of the road.

By taking into account at least one of the parameters described just above, the target speed $V_{targ}$ and the new target speed $V_{targ+1}$, can be determined according to the invention, such that each target speed or new target speed is between 5 and 30 km/h higher than the current vehicle speed $V_{Spd}$ measured at step 1100, preferably between 5 and 15 km/h higher than the current vehicle speed $V_{spd}$.

Preferably, a new target speed $V_{i+1}$ and a new threshold depression level $L_{i+1}$, $\alpha_{i+1}$ are determined each time the gear ratio is changed up.

In the example of FIG. 4, steps 1100, 1200 and 1300 are repeated several times such that several threshold depression levels $\alpha_1$, $\alpha_2$, $\alpha_3$, $\alpha_4$ as of the accelerator pedal 3 are determined and successively distributed along the accelerator pedal stroke.

In an alternative of steps 1200 and 1300, step 1200 may consist in or comprise determining from the current vehicle speed $V_{spd}$ a maximum acceleration rate $Acc_{max}$ and step 1300 may consist in or comprise determining 1300 at least one threshold depression level $L_i$, $\alpha$, of the accelerator pedal 3 that corresponds to the maximum acceleration rate $Acc_{max}$.

According to the alternative of step 1200, the maximum acceleration rate $Acc_{max}$ is preferably determined to be a compromised between an engine torque demand and the time that are necessary to reach a determined higher speed.

The maximum acceleration rate $Acc_{max}$ can be calculated according to the following formula:

$$Acc_{max} = \dot{V}_{spd} = G_1 \cdot V_{spd}^{0.7} - G_2 \cdot V_{spd} - G_3 \cdot V_{spd}^2 + G_4 \cdot T_{eng} + C_1$$

wherein
$V_{spd}$ is the current vehicle speed;
$T_{eng}$ is the current engine torque;
$G_1$ is an inertia coefficient that is function of the weight of the motor vehicle and of the gear ratio currently engaged;
$G_2$, G3 and $G_4$ are functions of the weight of the motor vehicle, of the gear ratio currently engaged and of the slope gradient of the road;
$C_1$ is function of the speed of the vehicle, slope gradient of the road, weight of the vehicle and of the gear ratio currently engaged.

According to the alternative of steps 1200 and 1300, a repetition of steps 1200 and 1300 may consist in or comprise determining a new maximum acceleration rate $Acc_{max}$ and a new threshold depression level $L_{i+1}$, $\alpha_{i+1}$ that corresponds to the new maximum acceleration rate $Acc_{max+1}$.

A new maximum acceleration $Acc_{max+1}$ and a new threshold depression level $L_{i+1}$, $\alpha_{i+1}$ are preferably determined each time the gear ratio is changed up.

A maximum acceleration rate $Acc_{max}$ or a new maximum acceleration rate $Acc_{max+1}$ is advantageously determined to allow the motor vehicle 1 to reach a higher speed that is determined to be between 5 and 30 km/h higher than the current vehicle speed $V_{Spd}$ measured at step 1100, preferably between 5 and 15 km/h higher than the current vehicle speed $V_{spd}$.

While the invention has been shown and described with reference to certain implementations thereof, it would be understood by those skilled in the art that changes in form and details may be made therein without departing from the spirit and scope of the invention as defined in the appended claims.

The invention claimed is:

1. Method to control acceleration of a motor vehicle from a current vehicle speed, wherein the motor vehicle comprises an accelerator pedal system able to generate on an accelerator pedal an added reaction force when depression of the accelerator pedal reaches a given depression level, comprising:

a) measuring the current vehicle speed;
b) determining a target speed of the motor vehicle depending at least on the current vehicle speed or determining from the current vehicle speed a maximum acceleration rate;
c) determining at least one threshold depression level of the accelerator pedal that corresponds to stabilization of vehicle speed at the target speed or that corresponds to the maximum acceleration rate;
d) generating an added reaction force on the accelerator pedal if the depression of the accelerator pedal reaches or is about to reach the threshold depression level;
wherein at least steps a), b) and c) are automatically repeated as the vehicle speed increases, and wherein, in step b), the maximum acceleration rate is determined to be a compromise between an engine torque demand and a time necessary to reach a determined higher speed.

2. Method according to claim 1 wherein step b) is initiated only if an intention of the driver to accelerate the motor vehicle or acceleration of the motor vehicle is detected.

3. Method according to claim 1, wherein steps a), b) and c) are repeated each time the vehicle speed increases of a speed value between 0.1 and 5 km/h.

4. Method according to claim 1, wherein steps a), b) and c) are continuously repeated as the vehicle speed increases.

5. Method according to claim 1, wherein each repetition of steps b) and c) consists in determining a new target speed and a new threshold depression level that corresponds to the stabilization of the vehicle speed at the new target speed.

6. Method according to claim 5, wherein the target speed and the new target speed are determined depending on an actual load of the motor vehicle and/or a gear ratio of a gearbox currently used and/or a current vehicle acceleration and/or a current slope of the road and/or a current curve of the road.

7. Method according to claim 6, wherein the target speed and the new target speed are determined such that each of them is between 5 and 30 km/h higher than the current vehicle speed.

8. Method according to claim 5, wherein the new target speed and the new threshold depression level are determined each time a gear ratio of a gearbox of the motor vehicle is changed up.

9. Method according to claim 1, wherein several intermediate threshold depression levels of the accelerator pedal are determined and are successively distributed along a stroke of the accelerator pedal.

10. Method to control acceleration of a motor vehicle from a current vehicle speed, wherein the motor vehicle comprises an accelerator pedal system able to generate on an accelerator pedal an added reaction force when depression of the accelerator pedal reaches a given depression level, comprising:
a) measuring the current vehicle speed;
b) determining a target speed of the motor vehicle depending at least on the current vehicle speed or determining from the current vehicle speed a maximum acceleration rate;
c) determining at least one threshold depression level of the accelerator pedal that corresponds to a stabilization of a vehicle speed at the target speed or that corresponds to the maximum acceleration rate;
d) generating an added reaction force on the accelerator pedal if the depression of the accelerator pedal reaches or is about to reach the threshold depression level;
wherein at least steps a), b) and c) are automatically repeated as the vehicle speed increases, wherein, in step b), the maximum acceleration rate is calculated according to the following formula:

$$Acc_{max} = \dot{V}_{spd} = G_1 \cdot V_{spd}^{0.7} - G_2 \cdot V_{spd} - G_3 \cdot V_{spd}^2 + G_4 \cdot T_{eng} + C_1$$

wherein:
$V_{spd}$ is the current vehicle speed;
$T_{eng}$ is a current engine torque;
$G_1$ is an inertia coefficient that is function of a weight of the motor vehicle and of a gear ratio currently engaged;
$G_2$, $G_3$ and $G_4$ are functions of the weight of the motor vehicle, of the gear ratio currently engaged and of a slope gradient of a road;
$C_1$ is function of the current vehicle speed, the slope gradient of the road, the weight of the vehicle and the gear ratio currently engaged.

11. Method to control acceleration of a motor vehicle from a current vehicle speed, wherein the motor vehicle comprises an accelerator pedal system able to generate on an accelerator pedal an added reaction force when depression of the accelerator pedal reaches a given depression level, comprising:
a) measuring the current vehicle speed;
b) determining a target speed of the motor vehicle depending at least on the current vehicle speed or determining from the current vehicle speed a maximum acceleration rate;
c) determining at least one threshold depression level of the accelerator pedal that corresponds to a stabilization of a vehicle speed at the target seed or that corresponds to the maximum acceleration rate;
d) generating an added reaction force on the accelerator pedal if the depression of the accelerator pedal reaches or is about to reach the threshold depression level;
wherein at least steps a), b) and c) are automatically repeated as the vehicle speed increases, wherein each repetition of steps b) and c) consists in determining a new maximum acceleration rate and a new threshold depression level that corresponds to the new maximum acceleration rate.

12. Method according to claim 11, wherein the new maximum acceleration rate and the new threshold depression level are determined each time a gear ratio of a gearbox of the motor vehicle is changed up.

13. Method to control acceleration of a motor vehicle from a current vehicle speed, wherein the motor vehicle comprises an accelerator pedal system able to generate on an accelerator pedal an added reaction force when depression of the accelerator pedal reaches a given depression level, comprising:
a) measuring the current vehicle speed;
b) determining a target speed of the motor vehicle depending at least on the current vehicle speed or determining from the current vehicle speed a maximum acceleration rate;
c) determining at least one threshold depression level of the accelerator pedal that corresponds to a stabilization of a vehicle speed at the target speed or that corresponds to the maximum acceleration rate;
d) generating an added reaction force on the accelerator pedal if the depression of the accelerator pedal reaches or is about to reach the threshold depression level;
wherein at least steps a), b) and c) are automatically repeated as the vehicle speed increases, wherein the maximum acceleration rate or a new maximum acceleration rate is determined to allow the motor vehicle to reach a higher speed that is determined to be between 5 and 30 km/h higher than the current vehicle speed.

* * * * *